United States Patent Office 2,779,679

Patented Jan. 29, 1957

2,779,679

METHOD OF MAKING A BAKERY SHORTENING

Lucas Kiers, Webster Groves, Mo., assignor to Hunter Packing Company, East St. Louis, Ill., a corporation of Illinois No Drawing. Original application July 10, 1956, Serial No. 173,011, now Patent No. 2,733,149, dated January 31, 1956. Divided and this application March 25, 1953, Serial No. 344,687

2 Claims. (Cl. 99—123)

The present invention relates to certain new and useful improvements in ingredients for bakery products such as bread, cake, and similar comestibles. This application is a division of my co-pending application Serial No. 173,011, filed July 10, 1950, now Patent No. 2,733,149, granted January 31, 1956.

It is, of course, well known, according to modern day baking technique, that bread and cake are made by incorporating flour, water, sugar, leavening agents, shortening, eggs and flavoring material into a dough which is baked. The mixtures vary for various types of products. Two things are important, good volume and satisfactory shelf life. The latter quality results from the ability of the baked product to retain moisture for relatively long periods of time so that it will not dry out too quickly.

At the present time, most bakers use shortening consisting of hydrogenated fats and emulsifying agents such as sorbitol derivatives. Such shortening, however, is comparatively expensive and does not produce a baked product having a very long shelf life. In fact, cakes made with such shortening did not remain fresh for more than forty-eight hours or thereabouts, whereas a much longer shelf life is recognized to be desirable.

In addition to moisture retention the baked product should also possess good volume and a comparatively fine grained uniform pore structure. These latter characteristics are also in very large measure dependent upon the quality of the shortening used.

It is the primary object of the present invention, therefore, to provide a new and improved ingredient which can be incorporated in bakery products to impart improved characteristics of moisture retention, volume, and pore structure.

It is another object of the present invention to provide an ingredient which may be incorporated in various ways into a bakery mix so as to increase the volume of the baked product and impart thereto improved pore structure and volume.

It is another object of the present invention to provide an improved shortening which is relatively inexpensive and produces a baked product having improved characteristics of moisture retention and uniform pore structure as well as increased volume.

With the above and other objects in view, my invention resides in the novel processes and compositions of matter presently described and pointed out in the claims.

Broadly speaking, the present invention resides in the discovery that certain materials of animal origin known as lipins may be added directly to the flour from which bakery products may be made or may be incorporated in the form of an improved shortening and when used in either manner will impart to the bakery product remarkably lengthened shelf life, more uniform pore structure, and increased volume. The material of the present invention is made from animal brains, spinal tissue, and pancreas and primarily includes sphyngomyelines and cerebrosides.

In practicing the present invention, animal brains, spinal tissue, and pancreas are thoroughly washed to remove all blood and the excess water drained away. It should be understood that any one of these types of animal matter may be employed, but because all are usually available as waste materials in the average packing plant, all may be used in the usual daily-run proportions. This animal matter is then finely comminuted and dried under vacuum at a temperature range from 100° F. to 150° F. The vacuum dried material is then pulverized and subjected to extraction with acetone to remove substantially all cholesterol. The extracted cholesterol can, of course, be removed and sold since there is a ready market for such material, but the further treatment and purification of cholesterol is in no way directly a part of the present invention.

The cholesterol-free residue is then dried to remove all traces of acetone and thereafter subjected to extraction with alcohol ($C_2H_5OH$). The residue from this extract is discarded and the extract crystallized out to provide a pale amber crystalline product which may be pulverized to any definite degree of fineness and may be referred to as powdered lipins. This product is a powder which may be added directly to flour or so-called dry cake mixes if desired and it has been found that bakery goods resulting from flour thus fortified will have remarkably improved qualities of moisture retention, highly uniform fine-grained pore structure and remarkably increased volume.

It has also been found in connection with the present invention that the above described dry pulverized product may be incorporated with fats to provide a low-cost shortening which will produce all the desired improvements in bakery goods made therewith. Such shortening may be made by dispersing the above described powder in water and adding such dispersion to a melted mixture of glyceryl mono and distearate, stearic acid, glycerin, lecithin, and a small quantity of a glyceryl ester of hydrogenated vegetable oils, or similar emulsifying agents. The product thus formed is a smooth creamy paste which may be added directly to the bakery mix.

By way of illustration, the following specific formulation has been found to be extremely desirable.

Aqueous mixture:

10 lbs. powdered lipins, 40 lbs. water. Stir together until thoroughly mixed.

Fat mixture:

Melt 7 lbs. stearic acid at approximately 150° F. and add 1 lb. triethanolamine. Separately melt 12 lbs. of glyceryl mono and distearate, add 11½ lbs. of emulsifier (glyceryl ester of hydrogenated vegetable oils), 5½ lbs. glycerin and 10 lbs. lecithin. Mix thoroughly and while melted add the stearic acid mixture.

To the melted fat mixture add the aqueous mixture and stir until a smooth creamy paste results.

It has also been found in connection with the present invention that the above described creamy paste may be added to lard to produce a shortening which is much cheaper than the hydrogenated fats and vegetable oils currently used and will produce much improved baking products. Such shortening may preferably be made by incorporating from 12 to 20 lbs. of the above described creamy paste with 200 lbs. of ordinary lard. This type of shortening can be used by the bakery in any conventional manner and employing conventional recipes or formulae, but the resulting baked products will have remarkably improved shelf life, highly uniform fine-grained pore structure and very substantially increased volume.

It should be understood that changes in the methods, composition, and combinations above set forth may be made without departing from the nature and principle of my invention.

Having thus described my invention, what I claim and desire to secure by Letters Patent is:

1. The method of making a bakery shortening which comprises forming a liquid-mixture of water and powdered animal lipins extracted from animal tissue of the class consisting of brains, pancreas and spinal tissue, forming a fat-mixture by melting together glyceryl mono and distearate and a glyceryl ester of hydrogenated vegetable oils and adding thereto glycerine and lecithin, adding the water-lipin mixture to the melted fat-mixture, stirring to form a smooth creamy paste, and thoroughly mixing said paste with lard in the proportion of approximately 5%–10% paste and 90%–95% lard.

2. The method of making a bakery shortening which comprises forming a liquid-mixture including not less than 80% by weight of water and not more than 20% by weight of animal lipins extracted from animal tissue of the class consisting of brains, pancreas and spinal tissue, forming a fat-mixture by melting together glyceryl mono and distearate and a glyceryl ester of hydrogenated vegetable oils and adding thereto glycerine and lecithin, adding the water-lipin mixture to the melted fat-mixture, stirring to form a smooth creamy paste, and thoroughly mixing said paste with lard in the proportion of approximately 5%–10% paste and 90%–95% lard.

References Cited in the file of this patent

UNITED STATES PATENTS

| | | |
|---|---|---|
| 266,580 | Burnet | Oct. 24, 1882 |
| 880,316 | Mann | Feb. 25, 1908 |
| 2,071,457 | Douglas | Feb. 23, 1937 |
| 2,575,874 | Herlow | Nov. 20, 1951 |

OTHER REFERENCES

Witcoff: The Phosphatides, pages 3 to 8, 1951.